United States Patent [19]
Phillips et al.

[11] Patent Number: 5,487,939
[45] Date of Patent: Jan. 30, 1996

[54] PROCESS FOR PREPARATION OF COLORED THERMOPLASTIC COMPOSITE SHEETING FOR LAMINATED STRUCTURES

[75] Inventors: Thomas R. Phillips, Vienna, W. Va.; Siva V. Vallabhaneni, Voorhees, N.J.

[73] Assignee: E. I. Du Pont de Nemours and Company, Wilmington, Del.

[21] Appl. No.: 117,111

[22] PCT Filed: Mar. 14, 1991

[86] PCT No.: PCT/US91/01586

§ 371 Date: Sep. 13, 1993

§ 102(e) Date: Sep. 13, 1993

[87] PCT Pub. No.: WO93/16369

PCT Pub. Date: Jan. 10, 1992

[51] Int. Cl.⁶ .................................................. B32B 3/00
[52] U.S. Cl. ........................ 428/334; 428/195; 428/206; 428/323; 428/340; 428/411.1; 428/500; 428/520; 156/230; 156/237; 156/240; 156/344
[58] Field of Search ................................ 156/230, 237, 156/240, 344; 428/437, 525, 195, 402, 334

[56] References Cited

U.S. PATENT DOCUMENTS

| | | | |
|---|---|---|---|
| 3,922,456 | 11/1975 | Baldridge | 428/203 |
| 4,035,549 | 7/1977 | Kennar | 428/409 |
| 4,173,672 | 11/1979 | Mannheim | 428/203 |
| 4,537,830 | 8/1985 | Hermann et al. | 428/437 |
| 4,925,725 | 5/1990 | Endo et al. | 428/156 |
| 4,952,457 | 8/1990 | Cartier et al. | 428/425.6 |
| 5,087,502 | 2/1992 | Esposito et al. | 428/156 |
| 5,130,174 | 7/1992 | Esposito | 428/156 |

*Primary Examiner*—Patrick J. Ryan
*Assistant Examiner*—William A. Krynski
*Attorney, Agent, or Firm*—Rodney B. Carroll

[57] ABSTRACT

A solvent-free transfer process for providing a uniformly colored interlayer sheeting having a roughened or embossed surface wherein a composite coating consisting of a layer containing finely divided solid crystalline pigment particles dispersed in a resin binder and at least one non-pigmented layer is transferred from a carrier film to the sheeting is disclosed. Transfer of the coating is accomplished while maintaining the pigment particles in the solid crystalline phase and maintaining the roughened surface of the sheeting.

11 Claims, 2 Drawing Sheets

PROCESS FOR PREPARATION OF COLORED THERMOPLASTIC COMPOSITE SHEETING FOR LAMINATED STRUCTURES

BACKGROUND OF THE INVENTION

1. Field of the Invention

The present invention relates to an improved process for preparation of colored thermoplastic composite sheeting for use in laminated structures. More particularly, the invention relates to a solvent-free transfer process to provide uniformly colored thermoplastic composites wherein the colorants include finely divided crystalline light-stable pigments. The laminated structures in which the colored thermoplastic composites are incorporated are essentially transparent and exhibit improved shatter performance.

2. Brief Description of the Prior Art

It is known to provide a color image having a continuous gradation or a pattern in safety glass for automobiles and architectural applications. Techniques such as direct gravure printing processes have been used to print dye based images directly onto thermoplastic sheeting used as interlayers in glass laminates. However, these methods are not adaptable for use with inks containing non-diffusive pigments. The peaks and the valleys of the roughened surface of the sheeting are not uniformly coated. The peaks receive more coating than the valleys resulting in distinct dots when the printed thermoplastic sheet is incorporated in the laminated structure, Other techniques such as solvent assisted transfer processes have been used to provide coloration of the thermoplastic sheeting. One such process is disclosed in published European Patent Application 0319583, published Jun. 14, 1989. In this process, an intermediate layer for laminated glass having a colored band containing dye and/or pigment is prepared by applying a volatile solvent to a plasticized polyvinyl butyral (PVB) sheet to dissolve PVB on the surface of the sheet to which a colored image is to be transferred, placing a colored image layer of a carrier substrate on top of the surface to which the solvent has been applied and then peeling away the carrier substrate. The composite structure so formed must then be dried to remove the solvent.

A process similar to the one described above utilizing a solvent to assist in the transfer of the colored image is disclosed in Japanese Patent Application 2-129049, published May 17, 1990. In this process, transfer of the colored image to the interlayer must be accomplished at temperatures of no more than 40° C. in order to retain the roughness of the interlayer.

The use of elevated heat and pressure in the above-mentioned solvent assisted transfer processes disturbs the surface characteristics of the interlayer which is roughened during manufacture. Maintaining the roughened surface is essential during lamination to aid in the deaeration of the laminate. Incomplete deaeration results in the formation of bubbles and consequent poor adhesion of the interlayer to the substrate.

In addition to the adverse effect on surface characteristics, the use of solvent to facilitate transfer of the coating to the interlayer presents other problems. The colored interlayer after transfer must be dried to remove the solvent from the interlayer. This requires an additional drying step followed by a solvent recovery step to reduce solvent emmisions. Further, as disclosed in the above mentioned Japanese Patent Application 2-129049, drying of the solvent at elevated temperatures poses a danger of producing shrinkage and warping of the PVB sheeting. Complete removal of the solvent is essential to prevent formation of solvent bubbles and consequent poor adhesion of the interlayer in a glass or glass/plastic laminate structure.

It is therefore an object of this invention to provide a solvent-free transfer process to produce a composite comprised of a thermoplastic sheeting and a thin film containing colors or patterns. Another object is to provide a process whereby laminated structures having uniform, stable coloration is obtained without detracting from the physical properties of the structures. It is a further object of this invention to provide a process which can be carried out at accelerated speeds. Still another object of this invention is to provide laminated structures which exhibit improved shatter performance.

SUMMARY OF THE INVENTION

The process of this invention is carried out by first preparing a composite, i.e. multilayered structure comprising a carrier film which is first coated with a thin layer of a non-pigmented resin. The non-pigmented resin layer of the film is then coated with an ink containing finely divided crystalline pigment particles which are dispersed in a solvent-containing binder resin. The coating is dried to remove the solvent and provide a solvent-free composite coating. The composition of the non-pigmented coating and the material for the carrier film are selected to provide a surface tension between the two surfaces to give ready separation of the coating from the carrier film.

A thermoplastic sheeting having a roughened surface is prepared by known methods. The roughened surface of the sheeting is brought into contact with the solvent-free surface of the composite coating on the carrier film. Separation of the composite coating from the carrier film and transfer of the coating to the surface of the sheeting As accomplished essentially instantaneously. Due to the instantaneous transfer of the coating to the sheeting, this process lends itself to a continuous operation.

In another embodiment of the process of this invention the composite coating on the carrier film may be overcoated with another layer of non-pigmented binder resin. It has been observed that transfer of the composite coating having an overcoated layer to the thermoplastic sheeting can be effected at a lower temperature than that required for transfer of a composite layer which has not been overcoated. Improvement in shatter resistance is found when the composite coated thermoplastic sheeting is incorporated in a laminated structure.

The solvent-free transfer process of this invention in which a non-pigmented barrier layer is first deposited on the carrier film is found to offer a number of advantages over a solvent assisted transfer process. By eliminating solvents in the transfer coating distortions in coloration caused by a phase change in the transfer coating are avoided. In the present process the pigmented coating on the carrier film is directly translated into the quality of the decorated laminate. Accordingly, a visual inspection of the coated substrate before transfer will detect print defects in the coating which would be transferred to the sheeting. Further, due to the solvent-free nature of transfer, the possible detrimental effect of retained solvent in the interlayer on adhesion to the glass is eliminated. Thus, substantial reduction of off-grade production which would be scrapped is effected offering opportunities for better waste management. In addition, environmental benefits due to the solvent-free nature of the transfer process are achieved as well as avoidance of costs associated with solvent removal and recovery.

DETAILED DESCRIPTION OF THE INVENTION

Figure 1:
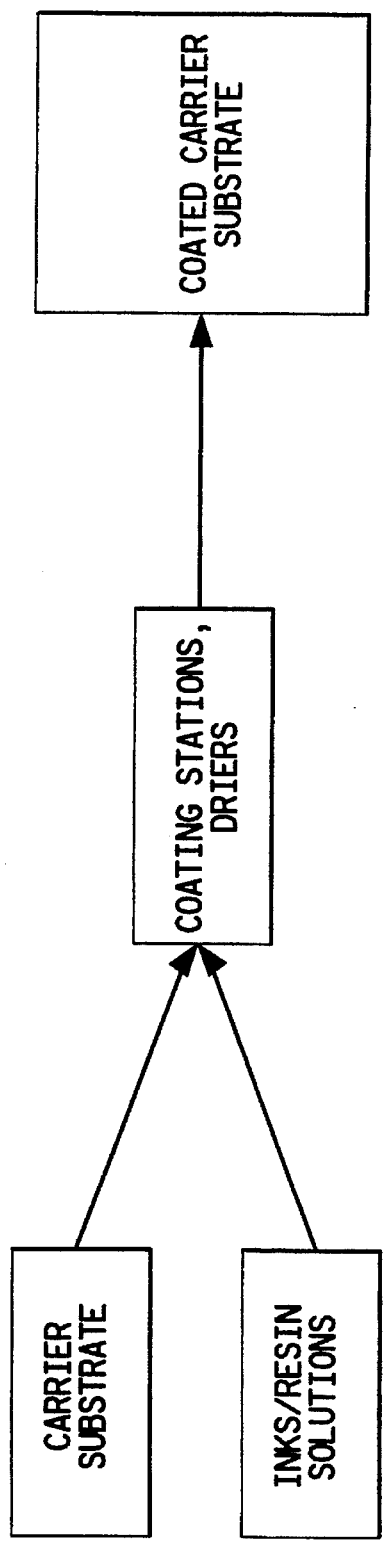
FIG. 1 is a block diagram representation of the process for applying the pigmented and non-pigmented coatings to the carrier film.

Referring now to the drawings. In FIG. 1 as illustrated by block diagram a carrier film is coated at one or more coating stations with a non-pigmented resin containing composition and a pigmented (ink/resin) coating solution. The pigmented coating solution may be applied by various coating methods including printing processes such as gravure printing, relief printing, offset printing etc. The coatings are dried. In some applications, more than one coating may be applied before drying. However, it may be beneficial to dry the individual coating layers before applying additional coating layers.

Figure 2:
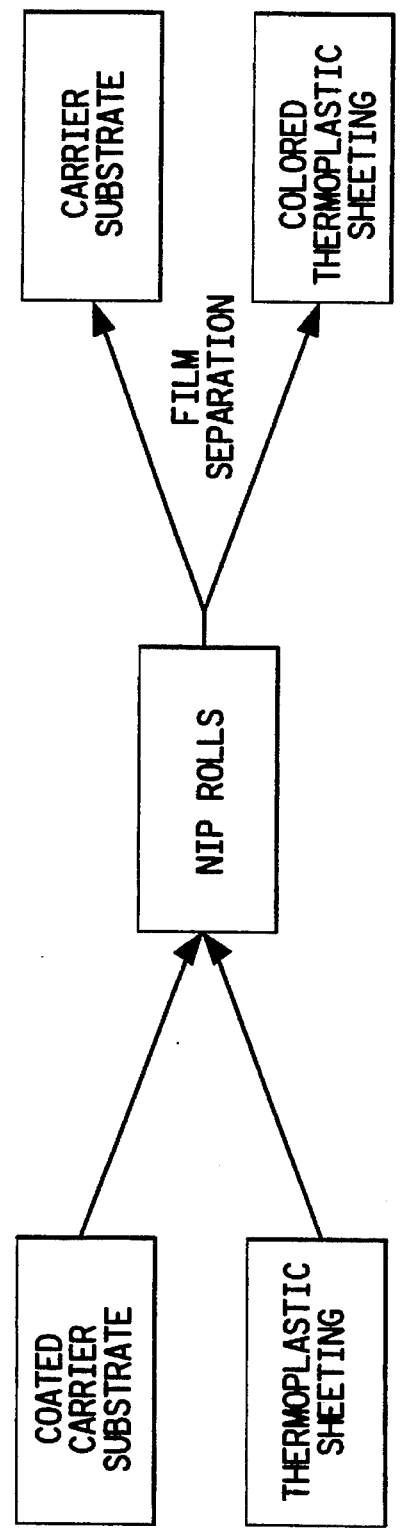
FIG. 2 is a block diagram representation of a process for transferring the composite coating prepared as shown in FIG. 1 to thermoplastic sheeting.

In FIG. 2 the coated carrier film is contacted with a thermoplastic sheeting, passed through nip rolls which are maintained at a controlled temperature with the coating being transferred to the thermoplastic sheeting as the carrier film and thermoplastic sheeting exit the nip rolls. It may be beneficial in effecting the transfer of the coatings to the thermoplastic sheet to heat the thermoplastic sheeting and/or the carrier film prior to passage through the nip rolls. Heating and pressure are controlled so that the surface roughness of the sheeting is retained. Depending on the speed and/or amount of preheating that the thermoplastic sheeting and/or carrier film may be subjected to, the nip roll temperature may vary from about 30° C. to about 300° C. The retention of the surface roughness is essential to prevent entrapment of air in laminated structures.

The process of this invention can be conducted as a batch type operation wherein the thermoplastic sheeting can be cut to the desired size and then subjecting it to desired temperature end pressure to facilitate transfer.

In carrying out the process of this invention, the ink is prepared by dispersing a pigment or pigments in a binder resin. A resin solution is prepared by dissolving the binder resin in suitable solvent or solvent blend. The resin selected may be the same or different from that used in preparing the pigmented dispersion. Pigments used for coloration in this invention are crystalline solids with extremely fine particle size with specific surface areas between 25 and 600 square meters/gram as measured by the BET ("Brunauer-Emmett-Teller") method. Preferred specific surface areas are from about 40 to 600 square meters/gram. The specific surface area of the pigment is defined as the total surface area of 1 gram of the pigment. The BET method for measuring the specific surface area is based on gas adsorption which is well known to those skilled in the art. For example, the book titled, "Dispersion of Powders in Liquids with Special Reference to Pigments", edited by G. D. Parfitt (Elsevier Applied Science Publishers, 1981, New York, N.Y.) includes a discussion of the BET method. The concentration of pigment in the coating will vary depending on the particular pigment selected, binder resin and solvent used. Generally, from about 0.1 to 10 percent by weight based on the total weight of the coating composition will be used.

In selecting the pigments for coloring the coating, color stability is an important factor particularly in outdoor applications such as automobile windshields and in decorated safety glass for buildings. Finely divided pigments are selected to provide transmission of light without appreciable light scattering. The chemical class of pigments will influence the color stability of the coating. For example, light fast pigments such as copper phthalocyanine blue, copper phthalocyanine green, carbazole violet, an anthraquinone red, quinacridone red, cadmium sulfoselenide red, monoazo red, azo condensation yellow, monoarylide yellow, diarylide yellow and isoindolinone yellow may be used as a single pigment or as a combination of pigments to impart a desirable color as measured by the CIE (Color Index Encyclopedia) chromaticity diagram.

Surprisingly it has been found that various chemical classes of pigments result in different shatter characteristics. Addition of carbon black as a co-pigment is found to improve shatter properties of the laminate. This improvement is found with and without the use of a non-pigmented resin coating in preparing the pigmented carrier film. Thus carbon black has been found to be useful as a shatter control additive in preparing safety glass laminates. The content of the carbon black in the ink can be infinitely variable, from 0 to 100% by weight(expressed as the percent of the pigment colorants). In multipigment systems, a minimum carbon black content of 10% (expressed as percent of pigment colorants) is found to improve shatter properties of the multipigmented coated laminate over those of the single pigment laminate. At carbon black content of over 60% by weight based an weight of pigment colorants, the shatter properties of the coated laminates are found to be essentially similar to those of uncoated laminates. If a desired color is required, the carbon black content maybe increased beyond 60% by weight based on the percent of pigment colorants.

In addition to the use of pigment colorants for light fastness of the coating, safety glass laminates which finds applications in transparent optical media such as in automobile windshields require that the haze of the laminate be low both in the colored gradient band and clear areas. Haze of the tinted coating, which is a result of scattering of light as it traverses the thickness of the glass laminate, is directly related to the ultimate particle size of the pigments in the pigment dispersion and shape of the pigment particles, i.e. the aspect ratio. Pigments for printing inks when finely dispersed with the aid of additives and suitable milling techniques result in highly transparent coatings which are associated with low haze. One skilled in the art can refer to the previously mentioned book edited by G. D. Parfitt for guidance with respect to the fundamentals of pigment dispersion, stability and flocculation of pigments in solution and the effects of particle physics and shape on the quality of coatings.

In preparing the inks for use in this invention, suitable binder resins include nitrocellulose, cellulose esters such as cellulose acetate butyrate, cellulose acetate propionate and cellulose acetate, and polyvinyl acetals such as polyvinyl butyral. Preferred binder resins are polyvinyl butyrals having a hydroxyl content, calculated as polyvinyl alcohol, from about 10 to 35% by weight. The polyvinyl acetate content of these resins is from about 0 to 5% and the polyvinyl butyral content is from about 60 to 90% by weight. The weight average molecular weight of these resins as determined by size exclusion chromatography is from about 10,000 to 250,000. The content of the polyvinyl alcohol, polyvinyl acetate and the polyvinyl butyral along with the weight average molecular weight strongly influences various properties of the ink such as pigment-dispersion stability, ink viscosity, ink surface tension, solvent/solvent blend selection, transfer conditions, adhesion and shatter resistance of the film transfer coating when used in safety glass applications. Preferred binder resin loadings in the inks, expressed as weight percent of the binder resin in the coating ink solution is about 0.1 to 40%.

Solvents or solvent blends useful in this invention are selected by considering such properties as the solubility of the binder resin, surface tension of the resulting coating solution and the evaporation rate of the coating solution. The solvent or solvent blend should also be chemically inert to the materials used in the carrier substrate and in the thermoplastic sheeting to which the coating is to be transferred. Other important criteria include the polarity and surface characteristics of the pigment and the chemical composition/ structure of stabilizing dispersants used in the inks.

Preferred solvents in amounts from about 28 to 99% by weight of the ink which can be used in the present invention are alcohols such as methanol, ethanol, n-propanol, isopropanol, n-butanol, iso-butanol, diacetone alcohol and benzyl alcohol, glycol ethers such as 1-methoxy-2-propanol, butyl glycol and methoxy butanol, esters such as glycolic acid-n-butyl ester, ketones such as cyclohexanone, and N-methyl-2-pyrrolidinone. In addition to the just-mentioned solvents, non-solvents and solvents possessing limited solubility such as methyl ethyl ketone, methyl iso-butyl ketone, methyl acetate, ethyl acetate, n-butyl acetate, aliphatic and aromatic hydrocarbons such as cyclohexane and toluene, respectively, may be used in conjunction with solvents.

Dispersants are useful in preparing the pigment based inks used in this invention. The choice of dispersant will depend on the pigment, binder resin and the solvent/solvent blend used in the inks. The binder resin may in some cases include the necessary stabilization characteristics required to prepare a stable pigment ink. The dispersants can be simple chemicals such as a sodium salt of a fatty acid, or complex polymers which possess a wide array of polar and non-polar functional groups. For example, some of the pigments used in this invention utilize dispersants such as polyvinyl pyrrolidinones, A-B type dispersants which use acrylics and polyesters, GTP type dispersants with a wide array of polar functional groups, and solutions of block copolymers with affixed groups, nitrocellulose, cellulose acetate butyrate, polyvinyl acetals, such as polyvinyl butyral to stabilize the pigment solutions. The amount of a given dispersant required for stabilization is dependent on the chemistry of the pigment surface and milling techniques used in the ink preparation. Preferred dispersant loadings for stabilization purposes, expressed as the weight percent of the dispersant in the coating ink is about 0 to 10%. The optimal dispersant loading for a given pigment is determined by a variety of techniques such as optical and scanning electron microscopy, film haze measurements and ink rheology.

In some applications it may be advantageous to use a combination of pigments and dyes for achieving a balance of color stability and reduced haze. Suitable dyes that may be incorporated in the pigmented inks include those disclosed in U.S. Pat. Nos. 2,739,080 and 4,391,867. Generally, the suitable dyes fall with the group of azo and anthraquinone dyes. In pigment-dye combinations, the dye concentration will generally be about from 25 to 75 percent based on the total weight of the pigments and dyes in the ink. Dyes which are non-crystalline and of a molecular size to permit diffusion into the polyvinyl butyral layer give highly transparent films with extremely low haze levels.

Plasticizers may be used in the inks and the binder resin coatings of the multilayered structures discussed below to enhance the flexibility of the coatings. Selection of a plasticizer is dependent on various factors such as the binder resin used and the plasticizers used in the thermoplastic sheeting to which the coating is transferred. For example, plasticizers such as polyhydric alcohol esters such as triethylene glycol di-2-ethyl-butyrate and tetra ethylene glycol di-heptanoate, aliphatic polybasic acid esters such as adipates (e.g., dihexyl adipate) and sebacates (e.g., dibutyl sebacate), aromatic polybasic acid esters such as dioctyl phthalate may be used. Preferred plasticizer levels, expressed as the weight percent of the plasticizer in the inks and resin solutions is about 0 to 30%.

In addition, non-ionic surfactants may be used in the inks and the resin coatings in the multilayer structures described below to reduce surface tension of the ink and to aid in wetting, leveling of the coating on the carrier substrate. For example, surfactants based on acetylenic chemistry and fluoro polymeric surfactants may be used. Preferred surfactant loadings, expressed as weight percent of the surfactant in the inks and resin solutions is about 0 to 5%.

The resin composition of the non-pigmented layer may be the same as or different from the binder resin for the pigmented layer. The composition is chosen to provide a surface tension level between the carrier substrate and the non-pigmented layer from about 10 to 60 dynes/cm. Preferred surface tension levels are from about 25 to 55 dynes/cm.

Carrier substrates may be selected from such materials as polypropylene, polyester, polyamide, and polyvinyl fluoride films and laminated or coated papers containing polymeric films. The thickness of the carrier substrate is generally about 0.00127 to 0.0762 centimeters (0.0005–0.03 inches). The carrier substrate may be treated to a desired surface tension level through flame treatment or corona treatment which is well known to those skilled in the art.

Figure 3:
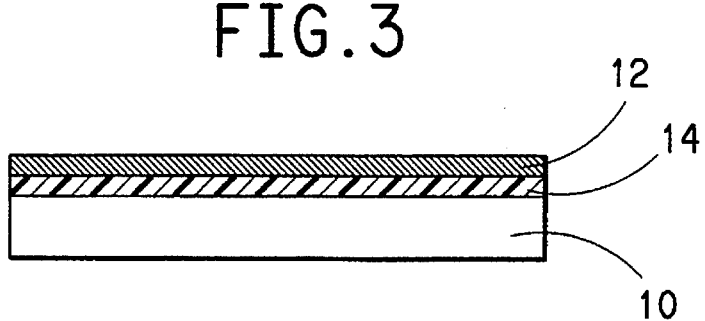
FIG. 3 is a sectional view of an embodiment of a coated carrier film of this invention.

The simplest structure which may be prepared by the process of this invention is shown schematically in FIG. 3. This structure consists of two coating layers, a pigmented coating 12 and a non-pigmented layer 14 adhered to a carrier substrate 10. This structure is prepared by precoating carrier substrate 10 with binder resin 14 in a suitable solvent or solvent blend. This is followed by overcoating the binder resin with a pigmented coating 12. Improved adhesion and isolation of the effects of the ink on adhesion to glass is provided. The thickness of the various layers is not critical, and the thickness of the various layers may be adjusted to give optimum transfer properties and desired coloration. Preferably the total thickness of the composite coatings will be in the range of from about 0.2 to 10 microns. Beyond a certain thickness increasing the thickness can be detrimental due to potential reduction of surface roughness. The thickness of the pigmented layer will very depending on the degree of pigmentation included in the ink and the final coloration desired.

Figure 4:
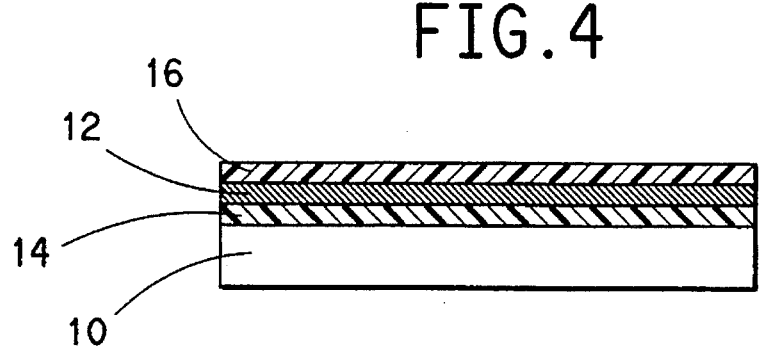
FIG. 4 is a sectional view of another embodiment of a coated carrier substrate of this invention.

The adhesion of the composite coating to the glass is determined by the Compressive Shear Strength test. The description of the Compressive Shear Strength test is included in the discussion which follow. Examples 1–3 show the unexpected results obtained by the structures of this invention in which a higher Compressive Shear Strength is achieved and a lower transfer temperature can be used than when a structure having only a single pigmented layer is used. A triple layered coating schematically represented in FIG. 4, consisting of an undercoat 14 of a binder resin solution followed by a middle coat 12 of pigmented ink and an overcoat 16 of a binder resin, provides improved adhesion and requires lower temperatures to achieve film transfer from the carrier substrate to the thermoplastic sheeting than single and double layer coatings discussed above. Further, double and triple layered structures provided by this invention transfer from the carrier substrate to the thermoplastic sheeting irreversibly.

In addition to the three multilayered structures discussed above, many variations of the composite structure are possible. For example, several layers of colors and binder resin can be coated onto the carrier substrate for subsequent transfer to the thermoplastic sheeting to provide multiple colors or with the same color can be used. The colors and binder resin compositions in each of the layers can be different.

It is to be understood that in referring to providing uniformly colored thermoplastic composites, in certain applications such as automotive windshields the coloration may be in gradient bands. In such applications the coloration will be uniform in the "machine direction" but will vary in intensity in the transverse direction. Coloration may be varied by adjusting the thickness of the coating and the amount of pigmentation in the coating.

Figure 5:
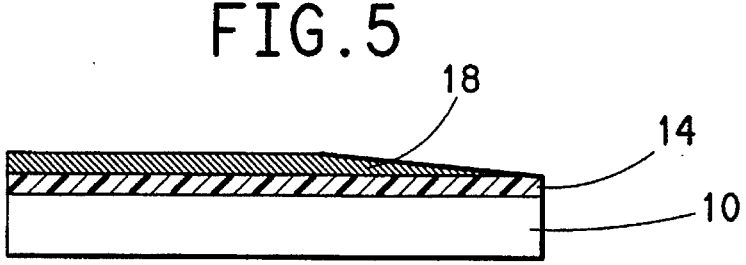
FIG. 5 is a sectional view of a carrier film on which a gradient band coating has been deposited.
Figure 6:
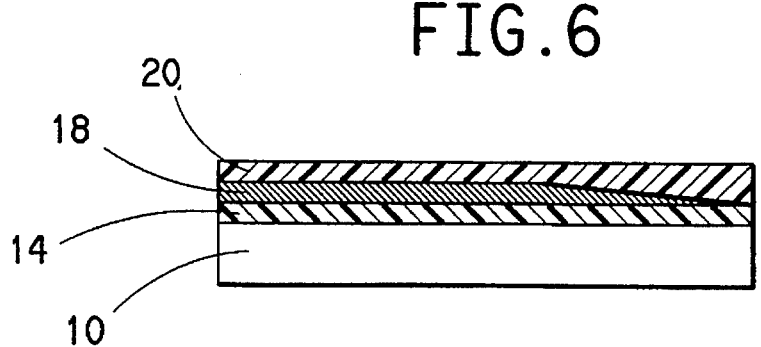
FIG. 6 is a sectional view of an embodiment of a carrier substrate with a composite coating including a gradient band according to this invention.

It has been found that with colored bands having a gradient pattern as shown in FIG. 5 incomplete transfer of the pigmented layer will occur if the transfer process is conducted so as to maintain the surface roughness of the thermoplastic sheeting. By following the process of this invention, i.e. by first coating a uniform thickness of a non-pigmented resin 14 onto the carrier substrate 10 followed by pigmented coating in a gradient band color layer 18 to give a uniform level of adhesion at the carrier substrate 10. A triple layer coating containing a gradient band color layer 18 is obtained by coating a non-pigmented resin layer 14 over carrier substrate 10 followed by gradient band color layer 18 with a non-pigmented layer 20 as schematically represented in FIG. 6. The above-mentioned multilayered structures are found to provide complete transfer of the composite coating to the thermoplastic sheeting in gradient band applications without disturbing the surface roughness of the thermoplastic sheeting.

The products of this invention are particularly useful for thermal film transfer to thermoplastic sheeting having a roughened surface, such as plasticized polyvinyl butyral used in safety glass laminates. Significantly lower transfer temperatures which may be used with the triple layered structures of the present invention ensure the retention of the surface roughness of roughened thermoplastic sheeting. At elevated temperatures, the surface roughness of the sheeting is irreversibly reduced. Retention of the surface roughness is essential to facilitate effective deaeration of the entrapped air during laminate preparation. Surface roughness, $R_z$, is expressed in microns by a 10-point average roughness in accordance with ISO-R468 of the International Organization for Standardization. For sheeting having a thickness greater than about 0.30, 10-point average roughness, $R_z$, of up to 45 microns is sufficient to prevent air entrapment. In prevent blocking a minimum roughness of about 20 microns is needed if the sheeting is to be wound up in a roll without interleaving or without anti-blocking agents. The surface roughness of thermoplastic resin sheeting and the methods of characterization and quantification of the surface roughness are discussed, for example in U.S. Pat. No. 4,671,913 to Gen et al, which is hereby incorporated by reference. The irreversibility of the double and triple layer transfer coatings of the present invention enables the process to be relatively insensitive to the film separation step schematically represented by the block diagram shown in FIG. 2. This insensitivity to film separation can be used advantageously to simplify control schemes for the process.

The invention is further illustrated by the following specific examples in which parts and percentages are by weight unless otherwise indicated. The adhesion and shatter resistance properties of the safety glass laminate in the following examples are quantified in terms of four tests, namely, compressive shear strength test, pummel adhesion test, penetration resistance test and break height test.

Compressive shear strength test measures the adhesion of the glass to the thermoplastic interlayer. For each test, five square one inch by one inch samples of the glass laminate are cut and the width of the specimens is measured to the nearest 0.001 inch. Each of the specimens is held at a 45° angle with the vertical and compression force is applied vertically at the rate of 0.1 inch per minute. The force required to break the bond between the glass and the interlayer is recorded and the compressive shear strength, hereby, abbreviated as, CSS, is calculated as follows:

$$CSS(\text{psi}) = \frac{\text{Force (pounds) required to break bond}}{\text{Area of sample}}$$

The average for the five samples is reported as the average CSS of the specimen. More details on the test procedure and typical apparatus used in these tests are discussed in U.S. Pat. No. 4,391,867 to Derick et al, which is hereby incorporated by reference.

Pummel adhesion test is a measure of the adhesion of the glass to the thermoplastic interlayer during shatter. In this test, the glass laminate in question is cooled to 0° F. and the thermally equilibrated sample is placed on a 45° inclined surface and subject to a constant pummeling by means of an impact tool, for example, a hammer. In this test, if all of the glass falls off the polyvinyl butyral, a pummel adhesion value is 0. If all of the glass is retained on the surface of polyvinyl butyral through a bonding contact, the corresponding pummel adhesion value is 1. U.S. Pat. No. 4,144,376 to Beckmann et al summarizes various pummel adhesion values, which is hereby incorporated by reference.

Penetration resistance test is a measure of the laminate to resist the penetration of a falling object. This test simulates typical conditions encountered by a safety glass laminate, such as the head of a driver hitting the windshield. This test is conducted according to ANSI Z 26.1 standard, test No. 26 (1977).

Break height test measures the height at which a 5-pound +/−0.5 ounce, solid smooth steel sphere used in the ANSI Z 26.1-1977, test No. 26 penetrates through the laminate. The 5 pound ball used in the test simulates the typical weight of a human head. Further, the test specimens and the means of mounting the same are those used in the ANSI Z 26.1-1977, test No. 26. In this test, the 5-pound sphere is dropped from various heights in the increments of 1 foot and measuring the height at which the object penetrates through the laminate.

EXAMPLES 1–3

EXAMPLES 1–3 illustrate the advantages accruing from the process of this invention in the ability to significantly lower the transfer temperature in transferring the ink containing coatings to a PVB (Butacite® Polyvinyl buryral Resin Sheeting available form E. I. du Pont de Nemours and Company as —B140 PVB) sheeting and the marked increase in the CSS adhesion. In three experiments ink containing 7.22% by weight of a combination of pigments was used. The relative pigment compositions in the ink consisted of: 48% carbon black, 40% copper phthalocyanine blue, 5% copper phthalocyanine green, and 7% carbazole violet. The remaining components in the ink consisted of 4.83% by weight of an acrylic surfactant for pigment stabilization, 7.22% by weight of a PVB resin having a hydroxyl content, calculated as polyvinyl alcohol, of 28% by weight, 80.73% N-methyl 2-pyrrolidinone. The multi-pigment ink was a bluish black color. In the first experiment, a polypropylene carrier substrate was coated only with a pigmented ink layer; in the second, the substrate was first coated with a non-pigmented resin containing layer, and in the third experiment, the pigmented ink layer was coated between a first layer of non-pigmented resin and an overcoating of the non-pigmented resin. The non-pigmented layers consisted of a 5% by weight solution of the PVB resin described above dissolved in methanol (content of —OH groups, caluclated as polyvinyl alcohol, 28% by weight).

The inks and coatings were applied uniformly to a 0.00309 centimeter (0.00122 inch) thick polypropylene film with a gravure cylinder (cell count of 79 cells per centimeter, cell depth of 0.0034 centimeter.) The coated film was dried and thermally contacted with a Butacite®—B140 PVB sheeting with a pair of nip rolls provided with an adjustable temperature setting. In these examples, the minimum temperature for transfer was determined by contacting the two films between the nip rolls at 5 ft/min at different temperatures and transferring the ink containing layers immediately after the nip rolls. A complete transfer, in these tests is characterized by complete transfer of the coating from the polypropylene film to the Butacite® sheet.

Further, the CSS of the coated laminates were determined. The glass in Examples 1–3 was washed with demineralized water prior to lamination.

TABLE 1

| Example | Coating Type | Minimum nip roll transfer Temp. (°C.) | CSS (psi) |
|---|---|---|---|
| 1 | Single Layer | 147 | 1656 |
| 2 | Double Layer | 127 | 2714 |
| 3 | Triple Layer | 88 | 2383 |

The above data clearly illustrate the lower temperatures required for transfer from the single the double and triple layer coated strictures of this invention. Further, the CSS adhesion increased with the double and triple layer concepts although they contained the same inks. These multi-layered structures contain an undercoat of the PVB resin which directly contacts the glass in the laminate and results in increased CSS adhesion.

EXAMPLES 4–6

Examples 4–7 show that the surface roughness of a 0.03 inch Butacite®—B140 PVB sheeting is substantially retained after thermal transfer processing. In these examples, an ink containing 2.7% by weight carbon black, 9.3% by weight of a PVB resin having a hydroxyl content, calculated as the polyvinyl alcohol, of 24–27% by weight, 64.2% by weight of 1-methoxy-2-propanol, 23.8% by weight of i-propanol was used. The binder resin coatings for the double and triple layer structures consisted of a 12% by weight solution of the PVB resin solution (the PVB resin having a hydroxyl content, calculated as polyvinyl alcohol, of 24–27% by weight) in 1-methoxy-2-propanol. The inks and the PVB resin coatings were coated uniformly on a 0.00309 centimeter (0.00122 inch) thick polypropylene film with a gravure cylinder (cell count of 79 cells per centimeter, cell depth of 0.0034 centimeter). The coated film was dried to volatilize all solvent and was then thermally transferred to a 0.03 inch thick Butacite®—B140 PVB sheeting with a pair of nip rolls set at the desired transfer temperature. The transfer printed sheeting was cooled to 20° C., and the surface roughness was measured with a Surfanalyzer® 4000 (Federal Products Corporation, Providence, R.I.). A ten point average coarseness of the film transfer coating on a normalized basis (clear sheeting=100) was calculated.

TABLE 2

| Example | Coating Type | Normalized Roughness (1) |
|---|---|---|
| 4 | Clear Sheeting | 100.0 |
| 5 | Double Layer | 93.1 |
| 6 | Triple Layer | 99.3 |

(1) Normalized roughness, $R_z$, is calculated by measuring 10 point the roughness, $R_z$, of the film transferred coating and normalizing with respect to that of the clear, unprocessed sheeting.

$$\text{Normalized Roughness} = \frac{R_z \text{ of the film transfer coating}}{R_z \text{ of the clear sheeting}} \times 100.$$

The above illustration clearly shows that the surface roughness of the solvent-free film transferred coating is substantially retained with the double and triple layered coatings.

EXAMPLES 7–9

Examples 7–9 compare the differences in adhesion between the carrier substrate and single, double and triple layer coatings containing a colored gradient band. The pigment ink used in these examples contained 3.5% by weight of a combination of pigments whose composition is described below, 9.63% by weight a PVB resin having a hydroxyl content, calculated as polyvinyl alcohol, of 24–27% by weight and 86.87% by weight of i-propanol solvent. The composition of the individual pigments was: carbon black 60%, dichloro quinacridone red 25% and copper phthalocyanine blue 15%. The resulting ink was gray in color. The binder resins for double and triple layer coatings consisted of 12% by weight of the PVB resin solution in a 50/50 weight percent solution of 1-methoxy-2-propanol and i-propanol. Uniform PVB resin coatings, 12.70 centimeters (5 inches) in width were used in the undercoat and overcoat layers of double and triple layer coatings. The PVB resin coating was generated with a gravure cylinder with a screen count of 69 cells per centimeter and a uniform cell depth of 0.0032 centimeters. A gradient band pattern, 12.7 centimeters in width (5 inches) for the colored layer was generated by a gravure cylinder with a cell count of 118 cells per centimeter. The depth of the cells was 0.0032 centimeters in the deepest end. The cell depth was linearly varied between 0.0032 and 0.0029 centimeters over a distance of 5.715 centimeters (2.25 inches)

from the deepest cell and exponentially varied between 0.0029 and 0 centimeters between 10. and 17.78 centimeters (4 and 7 inches) from the deepest cell to simulate the gradient band portion. Each of the coatings described above were dried in an air drier set at a suitable temperature to volatalize all of the solvents before applying other layers. The coatings were applied to the polypropylene surface of a 0.0041 centimeter (0.002 inches) thick polypropylene film.

A peel test consisting of bending a Scotch® tape 801 (registered trademark of 3M Company, St. Paul, Minn.) on the coated side of the carrier substrate followed by peeling the tape at a constant rate was used to determine the differences in adhesion of the coatings to the carrier substrate at various regions of the gradient band.

TABLE 3

| Example | Coating Type | Adhesion of the coating to Scotch ® tape |
| --- | --- | --- |
| 7 | Single Layer | Coating did not peel in the gradient band region between 9.7 and 12.7 centimeters (3.82 and 5 inches) |
| 8 | Double Layer | Complete peel of the coating in all areas of the band |
| 9 | Triple Layer | Complete peel of the coating in all areas of the band |

The above data clearly illustrates the differences in adhesion between the coating in the various regions of the single layer coating containing the gradient band. The gradient band portion of the single layer coating which is characterized by a significant variation in the coating thickness is found to adhere more strongly to the carrier substrate during the peel test. On the other hand, the PVB undercoat in double and triple layer coatings is found to facilitate uniform adhesion between the carrier substrate and the coating in all areas of the gradient band, thereby resulting in a complete peel of the coating during the peel test.

EXAMPLES 10–12

Examples 10–12 compare the differences in transfer of the various coatings containing the colored gradient band described in examples 7–9 in Table 3. Dried single, double and triple layer coatings were thermally transferred to 0.03 inch thick Butacite®—B140 PVB sheeting with a pair of nip rolls at 5 ft/min and 95° C.

TABLE 4

| Example | Coating Type | Quantitativeness of transfer |
| --- | --- | --- |
| 10 | Single Layer | Transfer was incomplete in the gradient band region between 9 and 12.7 centimeters (3.54 and 5.0 inches) |
| 11 | Double Layer | Complete transfer was effected in all areas of the band |
| 12 | Triple Layer | Complete transfer was effected in all areas of the band |

The above data clearly illustrates the use of the PVB undercoat in double and triple layer coatings facilitates in complete transfer of the coatings. This data is in agreement with the peel test data on the coatings which is discussed in examples 7–9 in Table 3.

EXAMPLES 13–16

Examples 13–16 illustrate the essentially instantaneous nature of the transfer process of this invention. In these examples, ink containing 3% by weight carbon black, 13.5% by weight PVB resin having a hydroxyl content, calculated as polyvinyl alcolhol, of 24–27% by weight and 83.5% by weight 1-methoxy-2-propanol was coated uniformly on a 0.00309 centimeters (0.00122 inches) thick polypropylene film using a gravure cylinder described in Examples 4–6. The coated film was dried to volatilize all solvent and then thermally contacted with 0.03 inch thick Butacite®—B140 PVB sheeting with a pair of nip rolls provided with an adjustable temperature setting and a variable speed drive.

In Examples 13–16 described below, nip roll temperature required for transfer was determined for a given speed. The bottom roll indicated in the table below contacted the coated polypropylene carrier substrate and the Butacite® PVB sheeting contacted the top roll.

TABLE 5

| | Nip Roll Temperatures | | Speed |
| --- | --- | --- | --- |
| Example | Bottom Roll (°C.) | Top Roll (°C.) | meters/minute (feet/minute) |
| 13 | 67.8 | 21.1 | 0.914(3.0) |
| 14 | 94.5 | 21.1 | 2.286(7.5) |
| 15 | 126.7 | 21.1 | 3.810(12.5) |
| 16 | 160.0 | 21.1 | 7.620(25.0) |

Complete transfer of the ink coating from the polypropylene film to the Butacite® PVB sheeting was effected at all speeds without deformation of the roughened surface of the sheeting.

Examples 17–20 which follow relate to the discovery that various pigments used for coloration result in different shatter properties of the colored coating in a glass-PVB laminate. It has been found that polar end groups in certain chemical classes of pigments interact with the glass by hydrogen bonding with the —OH groups in the glass. This results in the fracture of the laminate at the glass-PVB sheeting interface when subject to an impact force. This mode of fracture results in a poor shatter performance. On the other hand, fractures at the glass-pigmented coating interface are found to possess improved shatter properties.

The Pummel Adhesion values of a pigment based coating in a glass-PVB laminate have been found to be highly dependent on the chemical class of the pigment. Pigments such as dichloro quinacridone red, copper phthalocyanine green, and copper phthalocyanine blue give lower Pummel Adhesion values. NH and C=O groups in dichloro quinacridone red pigment provide hydrogen bondable end-groups with the —OH groups in the glass and thus, result in low Pummel Adhesion values due to fracture at the pigment coating-PVB sheeting interface. On the other hand, copper phthalocyanine green and copper phthalocyanine blue pigments which do not contain polar end groups structurally, but however, are surface treated to incorporate certain polar surface oxides to induce pigment flocculation resistance, result in somewhat higher Pummel Adhesion values. Carbon black pigment with its inert surface and absence of hydrogen bondable polar end-groups result in the highest Pummel Adhesion value. Glass-PVB laminate coated with carbon black based ink show that fracture of the glass-PVB laminate occurs at the glass-pigmented coating interface resulting in superior shatter properties.

EXAMPLES 17–20

The following examples illustrate the effects of various pigments on the Pummel Adhesion values of the pigment coated glass-PVB laminate. In examples 17–19, inks contained 7% by weight of the pigments listed below, 10.5% of a polyvinyl butyral resin having a hydroxyl content, calculated as polyvinyl alcohol, of 24–27% by weight and 82.5% by weight of 1-methoxy-2-propanol solvent. Carbon Black based ink in Example 20 contained 2.92% by weight of carbon black, 13.13% by weight of a polyvinyl butyral resin containing 24–27% —OH groups expressed as the percent of polyvinyl alcohol and 83.95% by weight of 1-methoxy-2-propanol solvent. The inks were coated uniformly on a 0.00122 thick polypropylene film using a #4 Meyer rod. The coating was dried to volatilize all solvents and was then contacted with a 0.03 inch thick Butacite® PVB sheeting with a pair of heated nip rolls. The two films were separated immediately after the nip rolls, resulting in the transfer of the coating to the PVB sheeting. The Pummel Adhesion values of the glass-coated PVB laminates were determined. In these tests the glass was washed with demineralized water prior to lamination.

TABLE 6

| Example | Pigment type in the Coating | Pummel Adhesion value |
|---|---|---|
| 17 | Copper Phthalocyanine Blue | 4.5 |
| 18 | Copper Phthalocyanine Green | 3.5 |
| 19 | Dichloro Quinacridone Red | 2.0 |
| 20 | Carbon Black | 8.0 |

The above data illustrates the surprising difference in shatter characteristics between various pigments in the coating and a coating containing carbon black.

EXAMPLES 21–26

The following examples show the shatter characteristics of various multi-pigment systems containing carbon black at different levels. In these examples, copper phthalocyanine blue, copper phthalocyanine green, dichloro quinacridone red and carbon black based inks whose compositions are described in Examples 17–20 respectively were used. Two-pigment inks containing different amounts of the carbon black ink and the various single pigment inks were mixed. The resulting inks were coated uniformly with a #4 Meyer rod on 0.00309 centimeters (0.00122 inch) thick polypropylene film, the coating was dried to volatilize solvent and was then transferred to a 0.03 inch thick Butacite®—B140 PVB sheeting. The Pummel Adhesion values of the laminates were determined.

In these examples, the weight percent of the individual pigments is based on the total weight of the pigments in the ink.

TABLE 7

| Ex. | Wt. % of Carbon Black | Wt. % of Cu Phthalo Blue | Wt. % of Cu Phthalo Green | Wt. % of Dichloro Quin.red | Pummel Adhesion Value |
|---|---|---|---|---|---|
| 21 | 56.25% | 43.75% | | | 8 |
| 22 | 56.25% | | 43.75% | | 8 |
| 23 | 56.25% | | | 43.75% | 7 |
| 24 | 12.5% | 87.5% | | | 6 |
| 25 | 12.5% | | 87.5% | | 3 |
| 26 | 12.5% | | | 87.5% | 3 |

Comparing Examples 21, 22 and 23 in Table 7 with Examples 17, 18 and 19 in Table 6 the addition of carbon black to the coating is shown to improve the shatter characteristics of the laminate. In Examples 24, 25 and 26 which contain a lower amount of carbon black, the Pummel Adhesion values of the pigmented coating were reduced and are found to closely approach those of the respective single pigment coatings described in Examples 17, 18 and 19 respectively.

We claim:

1. A process for preparing colored thermoplastic sheeting for use in laminated structures wherein the thermoplastic sheeting has a roughened surface, the steps comprising
   a) coating a layer having a uniform thickness of a non-pigmented binder resin onto a carrier film,
   b) coating an ink containing finely divided solid crystalline pigment particles dispersed in a solvent-containing binder resin onto the coated carrier film, to provide a composite coating on said carrier film having a thickness from about 0.2 to 10 microns,
   c) drying the said composite coating to remove the solvent and provide a solvent-free coating,
   d) bringing the solvent-free composite coating of step c) into contact with the roughened surface of said thermoplastic sheeting,
   e) separating said carrier film from said composite coating and transferring said composite coating to the surface of said thermoplastic sheeting by applying sufficient heat and pressure to release said composite coating from said carrier film while maintaining the roughened surface of said sheeting.

2. The process of claim 1 wherein the surface tension between said composite coating and said carrier film is from about 10 to about 60 dynes/cm.

3. The process of claim 1 wherein said pigment particles have a specific surface area from about 25 to about 600 square meters/gram.

4. The process of claim 1 wherein said binder resin is comprised of polyvinyl butyral resin having a hydroxyl content, calculated as polyvinyl alcohol, from about 10 to about 35% by weight.

5. The process of claim 1 wherein the surface of the composite coating is coated with a layer of a non-pigmented solvent-containing binder resin followed by drying the said coating, and thereafter transferring said composite coating to the surface of said thermoplastic sheeting.

6. The process of claim 1 wherein said ink contains carbon black in an amount of at least 10% based on the total weight of pigment in said coating.

7. The process of claim 1 wherein the coating of step b) is applied in a gradient band.

8. A thermoplastic composite sheet comprising a polyvinyl butyral film having a roughened surface, said film having a coating thereon containing finely divided crystalline solid pigment particles distributed in a resin binder on said surface and a non-pigmented coating of a resin binder overlaying said pigment-containing coating, said coatings having a combined thickness from about 0.2 to 10 microns.

9. The product of claim 8 wherein said resin binder is comprised of polyvinyl butyral resin having a hydroxyl content calculated as polyvinyl alcohol from about from about 10 to about 35% by weight.

10. The product of claim 8 wherein said finely divided pigment particles have a specific surface area from about 25 to about 600 square meters/gram.

11. A process for preparing colored thermoplastic sheeting for use in laminated structures wherein the thermoplastic sheeting has a roughened surface, the steps comprising:

a) coating a layer having uniform thickness of a non-pigmented binder resin onto a carrier film, b) drying the non-pigmented resin coating, c) coating an ink containing finely divided solid crystalline pigment particles dispersed in a solvent-containing binder resin onto the coated carrier film, d) drying the ink-containing coating to remove the solvent and provide a solvent-free coating, e) bringing the solvent-free composite coating steps a) through d) providing a composite coating on said carrier film having a thickness from about 0.2 to 10 microns into contact with the roughened surface of said thermoplastic sheeting;

f) transferring said composite coating to the surface of said thermoplastic sheeting by applying sufficient heat and pressure to release said composite coating from said carrier film while maintaining the roughened surface of said sheeting.

\* \* \* \* \*

UNITED STATES PATENT AND TRADEMARK OFFICE
CERTIFICATE OF CORRECTION

PATENT NO. : 5,487,939
DATED : Jan. 30, 1996
INVENTOR(S) : THOMAS R. PHILLIPS; SIVA V. VALLABHANENI

It is certified that error appears in the above-identified patent and that said Letters Patent is hereby corrected as shown below:

On the title page, item: [87], after PCT Pub. No.:, "WO93/16369" should read --WO92/1639--;

On the title page, item: [87], after PCT Pub. Date:, "Jan. 10, 1992" should read --Oct. 1, 1992--.

Signed and Sealed this

Eighteenth Day of June, 1996

Attest:

BRUCE LEHMAN

*Attesting Officer*           *Commissioner of Patents and Trademarks*